United States Patent [19]

Howard et al.

[11] Patent Number: 5,352,424
[45] Date of Patent: Oct. 4, 1994

[54] ALUMINUM NITRIDE POWDER HAVING A REDUCED AMMONIA ODOR AND A METHOD FOR PREPARING THE SAME

[75] Inventors: Kevin E. Howard; John R. Moyer, both of Midland, Mich.

[73] Assignee: The Dow Chemical Company, Midland, Mich.

[21] Appl. No.: 18,486

[22] Filed: Feb. 16, 1993

[51] Int. Cl.$^5$ .................. C01B 21/072; C01C 3/00
[52] U.S. Cl. .................. 423/237; 252/181.3; 423/265; 423/412
[58] Field of Search .............. 423/268, 412, 237, 265

[56] References Cited

U.S. PATENT DOCUMENTS

| 4,923,689 | 5/1990 | Uenishi et al. | 423/267 |
| 5,098,740 | 3/1992 | Tewari | 427/215 |

FOREIGN PATENT DOCUMENTS

| 62-264077 | 10/1987 | Japan | 21/72 |
| 63-151607 | 6/1988 | Japan | 21/72 |
| 225507 | 9/1988 | Japan | 423/412 |
| 63-225507 | 9/1988 | Japan | 21/72 |
| 61304 | 3/1989 | Japan | 423/412 |
| 64-61304 | 3/1989 | Japan | 21/72 |
| 164710 | 6/1989 | Japan | 423/412 |
| 1164710 | 6/1989 | Japan | 21/72 |
| 288412 | 3/1990 | Japan | 21/72 |
| 225307 | 9/1990 | Japan | 423/412 |
| 3261665 | 11/1991 | Japan | 35/58 |

OTHER PUBLICATIONS

Egashira et al., *Chemical Surface Treatments of Aluminum Nitride Powder Suppressing Its Reactivity with Water*, J. of Matls. Sci ltrs, 10(1991) 994–996.

*Primary Examiner*—Wayne Langel
*Attorney, Agent, or Firm*—Dan R. Howard

[57] ABSTRACT

An aluminum nitride powder that has substantially no ammonia odor after exposure to atmospheric moisture is obtained by admixing the powder with a gettering compound that sublimes or decomposes at a temperature below 500° C. The gettering compound is a $C_1$–$C_{11}$ aliphatic carboxylic mono- or polyfunctional acid, an anhydride or an ester of such an acid or an anhydride of an aromatic carboxylic acid.

14 Claims, No Drawings

ALUMINUM NITRIDE POWDER HAVING A REDUCED AMMONIA ODOR AND A METHOD FOR PREPARING THE SAME

BACKGROUND OF THE INVENTION

The present invention generally relates to a method for reducing or eliminating an ammonia odor associated with hydrolysis of aluminum nitride powder upon exposure thereof to atmospheric moisture. The present invention more particularly relates to placing aluminum nitride powder in operative contact with certain organic compounds that react with or getter ammonia generated by said hydrolysis. The present invention also relates to the resultant operative combination or treated powder.

Aluminum nitride exhibits certain physical properties that make it particularly suitable for use in a variety of applications. Some applications, such as those in packaging components for electronic circuitry, require substantially full theoretical density and high thermal conductivity. High quality aluminum nitride powder, when densified by sintering, hot-pressing or other suitable means, generally satisfies these requirements.

Aluminum nitride powder readily reacts with water or hydrolyzes to liberate ammonia. Even moisture present in air is sufficient to initiate at least localized hydrolysis. Ammonia, even in very low concentrations, has a sharp, intensely irritating odor. In much larger concentrations, inhalation may be harmful or fatal.

Attempts to minimize ammonia production focus largely upon imparting moisture resistance or oxidation resistance to aluminum nitride powder surfaces. JP 63-225507, for example, forms a hydrophobic film on powder surfaces by using one or more different compounds selected from among fatty acids, fatty acid amides, and aliphatic primary or secondary amines. The compound(s) should contain at least 12 carbon atoms and be adsorbed to the surface of the JP 2-88412 adsorbs an aromatic carboxylic acid on the surface of aluminum nitride powder to increase its resistance to oxidation by moisture in the air during handling or storage operations. JP 64-61304 treats surfaces of direct nitrided aluminum nitride with a surfactant to improve oxidation resistance. The surfactants include aliphatic carboxylic acids such as stearic acid and oleic acid, aliphatic carboxylic acid salts or esters, higher alcohols, sulfonic acids and Lewis acids. JP 62-264077 treats aluminum nitride powder with 0.05 to 5.0 wt % of a compound represented by a formula $CH_2=CXY$ where X is an aryl group, a substituted aryl group, a benzyl group, a substituted benzyl group, a styryl group or a substituted styryl group, all substituents have 1 to 5 carbon atoms, Y is a hydrogen atom of X. Styrene and methyl styrene are particularly preferred compounds. JP 63-51607 adsorbs one or more different monohydric alcohols onto the surface of aluminum nitride powder. Monohydric alcohols have a carbon number of one to 18.

It would be desirable if there were a simple, yet effective means or method of neutralizing, gettering or otherwise reducing or eliminating ammonia generated by hydrolysis of aluminum nitride powder upon exposure to atmospheric moisture.

SUMMARY OF THE INVENTION

One aspect of the present invention is an aluminum nitride powder that is substantially free of an ammonia odor upon exposure to atmospheric moisture comprising an operative combination of the aluminum nitride powder and an amount of a gettering compound sufficient to react with substantially all of the ammonia so generated, the gettering compound volatilizes, sublimes or decomposes at a temperature of less than about 500° C. and is selected from the group consisting of aliphatic carboxylic mono- or polyfunctional acids containing from one to eleven carbon atoms, esters of said carboxylic acids, anhydrides of said carboxylic acids and aromatic carboxylic acid anhydrides.

A second aspect of the present invention is a method of treating aluminum nitride powder to getter ammonia generated by hydrolysis of the powder upon exposure to atmospheric moisture comprising placing the powder in operative contact with an amount of a gettering compound sufficient to react with substantially all of the ammonia so generated, the gettering compound volatilizes, sublimes or decomposes at a temperature of less than about 500° C. and is selected from the group consisting of aliphatic carboxylic mono- or polyfunctional acids containing from one to eleven carbon atoms, esters of said carboxylic acids, anhydrides of said carboxylic acids and aromatic carboxylic acid anhydrides.

DETAILED DESCRIPTION OF THE INVENTION

Aluminum nitride powder suitable for purposes of the present invention need not be prepared by any particular method. It is preferably prepared by carbothermal reduction wherein aluminum oxide, carbon and nitrogen react at a high temperature. It may also be prepared by direct nitridation wherein aluminum metal powder is nitrided in a nitrogen or ammonia atmosphere at a high temperature. The resultant direct nitrided powder is usually pulverized to reduce the average particle size. Other known methods of synthesizing aluminum nitride powder may also be used if desired. The powder beneficially has an average particle size of from about 1 micrometer ($\mu$m) to about 20 $\mu$m.

Gettering compounds suitable for purposes of the present invention are used in an amount sufficient to getter or neutralize substantially all ammonia generated as a result of hydrolysis of aluminum nitride powder by moisture present in the atmosphere. Aluminum nitride powder may be exposed to moisture before it is packaged or after its protective packaging is opened or removed. Moisture may also be present within the packaging.

An amount of gettering compound within a range of from about 0.05 to about 3 parts by weight per hundred parts by weight of aluminum nitride powder provides very satisfactory results when the powder has a moisture content of from about 0.1 to about 0.3 weight percent (wt-%) based upon powder weight. The range is preferably from about 0.1 to about 0.5 parts by weight per hundred parts by weight of aluminum nitride powder. These limits, while appropriate for aluminum nitride powder having a moisture content of from about 0.1 to about 0.3 wt-%, may be excessive for powders with a moisture content of less than about 0.1 wt-% or insufficient for powders with a moisture content of greater than about 0.3 wt-%. The amounts will also vary depending upon which gettering compound is used. Skilled artisans will be able to select an appropriate amount of a gettering compound given the moisture content of a powder without undue experimentation.

Gettering compounds suitable for purposes of the present invention must meet two criteria. First, they must volatilize, sublime or decompose at a temperature of less than about 500° C., preferably less than about 400° C. Second, any decomposition product that remains must not have a significant adverse impact upon physical properties of a sintered body prepared from the aluminum nitride powder. A reduction of five percent or more from properties of a sintered body prepared from untreated aluminum nitride powder that has minimal exposure to atmospheric moisture may be regarded as a "significant adverse impact".

In addition to the foregoing mandatory criteria, there are several desirable criteria. Although some of the gettering compounds are liquids at room temperature (taken as 25° C.), operative combinations of aluminum nitride powder and gettering compounds tend to form more readily and be more compositionally uniform if the gettering compound is a solid rather than a liquid. The gettering compounds are preferably solid materials with a melting point of greater than or equal to 40° C. A second desirable criterion is solubility in lower alcohols such as methanol, ethanol, isopropanol and isobutanol. A third desirable criterion is a pKa that is sufficiently high to minimize, if not eliminate, a tendency to react with aluminum nitride. A fourth desirable criterion is an absence of a level of irritation or hazard that requires undue precautions or special equipment or both.

Gettering compounds are desirably selected from the group consisting of aliphatic carboxylic mono- or polyfunctional acids containing from one to eleven carbon atoms, esters of said carboxylic acids, anhydrides of said carboxylic acids and aromatic carboxylic acid anhydrides. As used herein, the term "monofunctional acid" means an acid having one carboxyl group. The term "polyfunctional acid" means an acid having two or more, preferably two or three, carboxyl groups. The aliphatic carboxylic acids may be straight-chained acids, branched-chain acids or substituted acids. They may also be saturated or unsaturated. The acids may be represented by a formula:

$R(COOH)_y$ where y is 1, 2 or 3 and R is H, —COOH or has from 1 to 10 carbon atoms, provided that when y is 2, R contains no more than 9 carbon atoms and when y is 3, R contains no more than 8 carbon atoms. Carboxylic acids include: formic acid; saturated straight-chain monofunctional acids such as acetic acid, butanoic acid and n-undecanoic acid; saturated branched-chain monofunctional acids such as 2-methyl butanoic acid or pivalic acid (2,2-dimethylpropanoic acid); unsaturated straight-chain monofunctional acids such as 2-butenoic acid; unsaturated branched-chain monofunctional acids such as 2-methyl-2-pentenoic acid; dicarboxylic acids such as oxalic acid, malonic acid, succinic acid, glutaric acid, adipic acid, maleic acid and fumaric acid; and tricarboxylic acids such as citric acid (2-hydroxy, 1,2,3-propanetricarboxylic acid). Suitable anhydrides include phthalic anhydride and succinic anhydride. Desirable esters include ethyl formate and triethyl citrate. The gettering compound is preferably citric acid, n-undecanoic acid, phthalic anhydride or succinic anhydride, more preferably citric acid or phthalic anhydride and most preferably citric acid.

The gettering compound need not be placed in operative contact with the aluminum nitride by any special technique. It is preferably dispersed in a manner sufficient to provide a generally uniform, more preferably a substantially uniform, admixture or operative combination. Solid gettering compounds are preferably admixed, or placed in operative contact, with aluminum nitride powder using conventional dry blending apparatus such as a ribbon blender, a ball mill, an attritor mill or a jet mill. A ribbon blender yields particularly satisfactory results. An alternative procedure that is suitable for solid compounds, but is especially satisfactory for liquid compounds, involves a step of dispersing the gettering compound in an alcohol or other suitable solvent prior to dispersing aluminum nitride powder in the solvent. Depending upon the gettering compound and the solvent, the act of admixing forms either a slurry or a solution. A lower ($C_1$-$C_4$) alcohol such as ethanol, isopropanol or butanol provides satisfactory results. The solvent may then be removed by conventional techniques such as spray drying or oven drying.

The operative combination, once prepared, may be used immediately or stored for later use in a suitable container such as a fiber pack. The admixture may be converted to a useful article by conventional procedures such as pressureless sintering. The presence of a gettering compound does not necessitate any change in procedure.

The gettering compound need not be in direct contact with aluminum nitride powder in order to eliminate the ammonia odor. An alternate means of putting the gettering compound in operative contact with aluminum nitride powder involves placing the gettering compound into one or more porous packages or containers that are permeable to gaseous ammonia. The design of such a package or container is not particularly critical so long as sufficient gettering compound is readily available. The packages or containers are then placed in contact with, or in admixture with, at least a surface portion of the aluminum nitride powder. In addition, the gettering compound may be incorporated into a liner for a fiber pack or other bulk container or even into the material from which such a container is formed. The latter technique provides satisfactory results so long as it makes sufficient gettering compound available for a reaction with any ammonia released by hydrolysis of aluminum nitride disposed within the container.

The following examples simply illustrate the present invention and are not to be construed, by implication or otherwise, as limiting its scope. All parts and percentages are by weight and all temperatures are in ° Celsius (°C.) unless otherwise stated.

EXAMPLE 1

Thirty grams of aluminum nitride powder having a moisture content of about 0.15 wt-% were placed into each of four 250 ml Nalgene ® (Nalgene Company) brand high density polyethylene containers. The containers were tightly capped and left closed for one week to allow each container to develop its own ammonia-containing atmosphere. The aluminum nitride powder had an average particle size of 1.4–1.6 μm and an oxygen content of about 1.20%.

After one week the containers were opened. One gram of citric acid was placed in one container, one gram of phthalic anhydride was placed in a second container and one gram of succinic anhydride was placed in a third container. A fourth container, designated as a control, received no additive. All four containers were then closed for a period of one hour.

After one hour, a blind smell test was conducted by having an individual unfamiliar with the experiment, its objective and the contents open each container and determine what, if any, odor might be present. The individual detected an ammonia odor only in the control container. The results were unchanged in similar tests 24 hours and 5 months later.

To provide a more objective analysis, a strip of wet pH paper was placed inside each of the containers which were then tightly capped again. The pH paper in the control container indicated a pH of about 9 whereas the paper in each of the other three containers indicated a pH of about 7. The pH of 9 suggests the presence of ammonia whereas the pH of 7 suggests its absence.

EXAMPLE 2

Ten grams of the same type of aluminum nitride powder as in Example 1 were, after exposure to a temperature of 85° and a relative humidity of 85% for two minutes, placed into each of four 125 ml Nalgene ® (Nalgene Company) brand high density polyethylene containers equipped with screw top lids. To one container, 0.01 g of n-undecanoic acid was added. Formic acid (0.01 ml) and citric acid (0.01 g) were added, respectively, to a second and a third container. The remaining container, designated as a control, received no additive. All four containers were sealed for a period of 16 hours.

After the 16 hour period, a blind test, as in Example 1, was conducted to determine whether ammonia odor was present in any of the containers. The control exhibited a very strong ammonia odor. The container to which formic acid was added possessed a faint ammonia odor. Subsequent addition of another 0.01 ml of formic acid eliminated any remaining ammonia odor as evidenced by rechecking two hours later. No ammonia odor was detected in either of the other containers.

EXAMPLE 3

Twenty gram samples of the same type of aluminum nitride powder as in Example 1 were added to eight 125 ml Nalgene ® (Nalgene Company) brand high density polyethylene containers equipped with screw top lids. Citric acid amounts of 0.01%, 0.05%, 0.10%, 0.20%, 0.25%, 0.50% and 0.75% were placed in seven of the containers with a different amount in each container. The eighth container received no citric acid and served as a control. The containers were then sealed for a period of two weeks.

After the two week period, a blind test, as in Example 1, was conducted to determine whether ammonia odor was present in any of the containers. The control container and the container with 0.01% citric acid exhibited a similar ammonia odor. The container with 0.05% citric acid exhibited a lighter ammonia odor than the strong ammonia odor associated with the control container and the container with 0.01% citric acid. No ammonia odor was detected in the other containers.

Sintered portions of the samples, when tested for properties density, oxygen content, carbon content and thermal conductivity, did not show that citric acid adversely affected any property.

EXAMPLE 4

Example 3 was replicated save for substituting phthalic anhydride for citric acid. As in Example 3, the control container and the container with 0.01% phthalic anhydride exhibited a similar ammonia odor. Also as in Example 3, the container with 0.05% phthalic anhydride exhibited a lighter ammonia odor than the control container and the container with 0.01% phthalic anhydride. No ammonia odor was detected in the other containers. The sintered samples, as in Example 3, showed no adverse effect upon physical properties due to the presence of phthalic anhydride.

The data presented in Examples 1 through 4 show that citric acid, formic acid, n-undecanoic acid, phthalic anhydride and succinic anhydride effectively eliminate ammonia odor without adversely affecting aluminum nitride physical properties. Similar results are expected with other gettering compounds disclosed herein. Amounts may vary, however, depending upon the choice of gettering compound. For example, a monofunctional acid, such as formic acid or acetic acid, must be present in a greater concentration than a polyfunctional acid, such as citric acid, to attain an equivalent reduction of ammonia odor.

What is claimed is:

1. An aluminum nitride powder that is substantially free of an ammonia odor upon exposure to atmospheric moisture comprising an operative combination of the aluminum nitride powder and an amount of a gettering compound sufficient to react with substantially all of the ammonia so generated, the gettering compound volatilizes, sublimes or decomposes at a temperature of less than about 500° C. and is selected from the group consisting of aliphatic carboxylic polyfunctional acids containing from one to eleven carbon atoms, esters of said carboxylic acids, anhydrides of said carboxylic acids and aromatic carboxylic acid anhydrides.

2. The powder of claim 1 wherein the gettering compound is selected from the group consisting of citric acid, phthalic anhydride and succinic anhydride.

3. The powder of claim 1 wherein the amount of gettering compound is from about 0.05 to about 3 parts by weight per hundred parts by weight of aluminum nitride powder, when the powder has a moisture content of from about 0.1 to about 0.3 weight percent, based upon powder weight.

4. The powder of claim 1 wherein the gettering compound is citric acid.

5. A method of treating aluminum nitride powder to getter ammonia generated by hydrolysis of the powder upon exposure to atmospheric moisture consisting essentially of placing the powder in operative contact with an amount of a gettering compound sufficient to react with substantially all of the ammonia so generated, the gettering compound volatilizes, sublimes or decomposes at a temperature of less than about 500° C. and is selected from the group consisting of aliphatic carboxylic polyfunctional acids containing from one to eleven carbon atoms, esters of said carboxylic acids, anhydrides of sad carboxylic acids and aromatic carboxylic acid anhydrides.

6. The method of claim 5 wherein the gettering compound is selected from the group consisting of citric acid, phthalic anhydride and succinic anhydride.

7. The method of claim 5 wherein the amount of gettering compound is from about 0.05 to about 3 parts by weight per hundred parts by weight of aluminum nitride powder, when the powder has a moisture content of from about 0.1 to about 0.3 weight percent, based upon powder weight.

8. The method of claim 5 wherein the gettering compound is citric acid.

9. The method of claim 5 wherein the aluminum nitride powder is placed in operative contact with the gettering compound by sequentially dispersing the gettering compound in a suitable solvent, dispersing the aluminum nitride powder in the solvent, and removing the solvent.

10. The method of claim 9 wherein the solvent is a lower ($C_1$-$C_4$) alcohol.

11. The method of claim 9 wherein the solvent is removed by spray drying or oven drying.

12. The method of claim 5 wherein the aluminum nitride powder is placed in operative contact with the gettering compound by packaging the gettering compound into one or more porous packages or containers that are permeable to gaseous ammonia, said container(s) or package(s) being placed in contact with, or in admixture with, at least a surface portion of the aluminum nitride powder.

13. The method of claim 5 wherein the aluminum nitride powder is placed in operative contact with the gettering compound by dry blending the aluminum nitride powder and the gettering compound.

14. The method of claim 13 wherein dry blending is accomplished by ribbon blending.

* * * * *